US012678753B2

(12) United States Patent
Bartolucci

(10) Patent No.: US 12,678,753 B2
(45) Date of Patent: Jul. 14, 2026

(54) MAGNETIC SELF-STIRRER

(71) Applicant: WHIRLPOOL CORPORATION, Benton Harbor, MI (US)

(72) Inventor: Alberto Bartolucci, Fossombrone (IT)

(73) Assignee: Whirlpool Corporation, Benton Harbor, MI (US)

( * ) Notice: Subject to any disclaimer, the term of this patent is extended or adjusted under 35 U.S.C. 154(b) by 1019 days.

(21) Appl. No.: 17/717,733

(22) Filed: Apr. 11, 2022

(65) Prior Publication Data

US 2023/0321619 A1 Oct. 12, 2023

(51) Int. Cl.

*B01F 33/452* (2022.01)
*H05B 6/64* (2006.01)
*H05B 6/74* (2006.01)

(52) U.S. Cl.

CPC ......... *B01F 33/452* (2022.01); *H05B 6/6402* (2013.01); *H05B 6/74* (2013.01)

(58) Field of Classification Search

CPC ....... B01F 33/452; H05B 6/6402; H05B 6/74; H05B 6/745; H05B 6/782

See application file for complete search history.

(56) References Cited

U.S. PATENT DOCUMENTS 1,772,083 A * 8/1930 Hollenback ............. B01F 29/81 366/602
2,828,950 A * 4/1958 Stilwell ................. A47J 27/004 40/538
3,390,868 A * 7/1968 Kaufman ................ B01F 27/05 416/227 R
3,433,465 A * 3/1969 Szpur .................... B01F 33/452 219/535
4,054,270 A * 10/1977 Gugger ................. B01F 33/452 366/181.5
4,911,556 A * 3/1990 Lim ...................... B01F 31/441 366/279
5,549,382 A 8/1996 Correia et al.
6,076,957 A 6/2000 Gomes
7,199,341 B2 4/2007 Kaneko et al.
10,220,361 B1 * 3/2019 Dushine .................. B01F 21/10

(Continued)

FOREIGN PATENT DOCUMENTS

DE 19543401 A1 * 5/1997 .......... B01F 13/0818
DE 102019006985 A1 * 4/2021

(Continued)

OTHER PUBLICATIONS

Laminated Plastics (2014), Technical Data Sheet Teflon (PTFE), retrieved on Mar. 10, 2025 from <https://www.laminatedplastics.com/teflon.pdf> (Year: 2014).*

*Primary Examiner* — Claire X Wang
*Assistant Examiner* — Patrick M McCarty
(74) *Attorney, Agent, or Firm* — Price Heneveld LLP

(57) ABSTRACT

A stirring assembly includes a turntable configured to rotate about a central axis. A cooking vessel is configured to engage a top surface of the turntable. A bar is disposed proximate a bottom surface of the turntable. The bar maintains a fixed position relative to the turntable. A stirrer is magnetically attracted to the bar. The stirrer is configured to generally maintain a fixed orientation within the cooking vessel as the cooking vessel rotates with the turntable.

18 Claims, 7 Drawing Sheets

(56) References Cited

U.S. PATENT DOCUMENTS

| | | | | |
|---|---|---|---|---|
| 2004/0025706 | A1* | 2/2004 | Greenstreet | H05B 6/6411 99/348 |
| 2004/0173606 | A1* | 9/2004 | Lindley | H05B 6/6411 219/754 |
| 2006/0112838 | A1* | 6/2006 | Herbst | B01F 33/45 99/422 |
| 2008/0151683 | A1* | 6/2008 | Meadows | B01F 35/531 248/676 |
| 2013/0344204 | A1* | 12/2013 | Goodson | B01F 27/213 219/601 |
| 2017/0020338 | A1* | 1/2017 | Lim | A47J 36/165 |
| 2018/0043321 | A1* | 2/2018 | Mochizuki | B01F 27/13 |
| 2020/0069102 | A1 | 3/2020 | Machado Martins et al. | |
| 2022/0071449 | A1* | 3/2022 | Siu | B01F 27/091 |
| 2022/0349911 | A1* | 11/2022 | Kawabe | B01F 33/45 |

FOREIGN PATENT DOCUMENTS

| | | | | | |
|---|---|---|---|---|---|
| GB | 2268392 | A | * | 1/1994 | A47J 31/20 |
| WO | 9305345 | A1 | | 3/1993 | |
| WO | WO-2021157216 | A1 | * | 8/2021 | B01F 33/45 |

* cited by examiner

MAGNETIC SELF-STIRRER

BACKGROUND OF THE DISCLOSURE

The present disclosure generally relates to a magnetic self-stirrer, and more specifically, to an automatic stirring assembly for use in a cooking appliance, such as a microwave oven.

SUMMARY OF THE DISCLOSURE

According to one aspect of the present disclosure, a stirring assembly includes a turntable configured to rotate about a central axis. A cooking vessel is configured to engage a top surface of the turntable. A bar is disposed proximate a bottom surface of the turntable. The bar maintains a fixed position relative to the turntable. A stirrer is magnetically attracted to the bar. The stirrer is configured to generally maintain a fixed orientation within the cooking vessel as the cooking vessel rotates with the turntable.

According to another aspect of the present disclosure, a stirring assembly for use with a cooking vessel includes a turntable that is operable between a rotating state and a non-rotating state. The turntable is configured for rotation about an axis and includes a top surface and a bottom surface. A bar is disposed proximate the bottom surface of the turntable. The bar maintains a fixed position while the turntable is in the rotating state. A stirrer is proximate the top surface of the turntable. The stirrer is magnetically attracted to and aligned with a longitudinal extent of the bar. The stirrer is configured to generally maintain a fixed orientation within the cooking vessel as the cooking vessel rotates with the turntable such that the stirrer does not rotate with the cooking vessel.

According to yet another aspect of the present disclosure, a microwave assembly includes a plurality of walls that define a cooking compartment and a turntable that is configured to rotate about a central axis. The turntable is also configured to support a cooking vessel. A bar is operably coupled with at least one of the plurality of walls that define the cooking compartment. The bar is disposed proximate a bottom surface of the turntable and maintains a fixed position relative to the turntable. A stirrer is attracted to the bar. The stirrer is configured to generally maintain a fixed orientation within the cooking vessel as the cooking vessel rotates with the turntable.

These and other features, advantages, and objects of the present disclosure will be further understood and appreciated by those skilled in the art by reference to the following specification, claims, and appended drawings.

Figure 1:
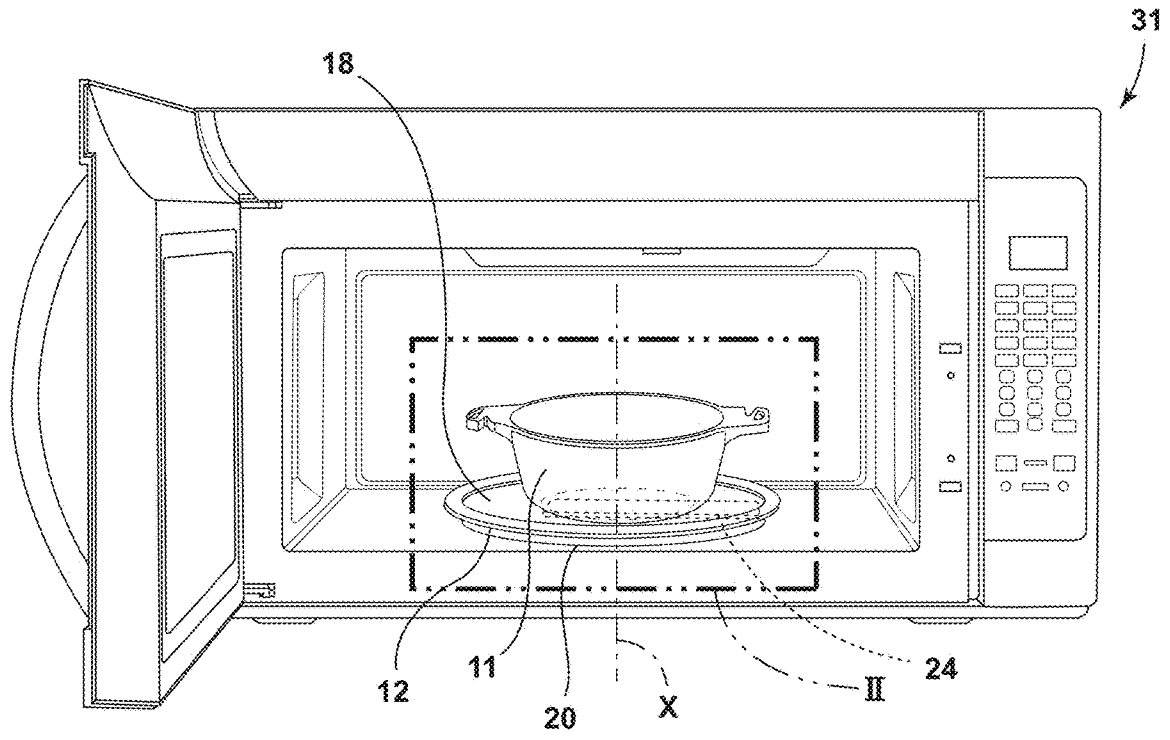
FIG. 1 is a front elevational view of a cooking appliance incorporating a stirring assembly of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a stirring assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-7, reference numeral 10 generally designates a stirring assembly for use with a cooking vessel 11 that includes a turntable 12 that is operable between a rotating state 14 and a non-rotating state 16. The turntable 12 is configured for rotation about a central axis X. The turntable 12 includes a top surface 18 and a bottom surface 20. A bar 24 is disposed proximate the bottom surface 20 of the turntable 12. The bar 24 maintains a fixed position relative to the cooking vessel 11 while the turntable 12 is in the rotating state 14. A stirrer 30 (FIG. 3A) is proximate the top surface 18 of the turntable 12. The stirrer 30 is magnetically attracted to and aligned with a longitudinal extent of the bar 24. The stirrer 30 is configured to generally maintain a fixed orientation within the cooking vessel 11 as the cooking vessel 11 rotates with the turntable 12 such that the stirrer 30 does not rotate with the cooking vessel 11.

With reference again to FIG. 1, a cooking device 31 in the form of a microwave assembly that includes a plurality of walls that define a cooking compartment is illustrated. However, it is generally contemplated that other devices used for cooking can also be utilized. It is also contemplated that a turntable and bar could be installed or retrofitted into an existing microwave oven or other appliance. In the illustrated configuration, the turntable 12 is configured for rotation inside the cooking vessel 11. The turntable 12 rotates about the central axis X, in a direction of arrow Y, to assist and provide uniform cooking of food goods disposed inside the cooking vessel 11. Although the turntable 12 of FIG. 1 is configured to rotate about the central axis X, the turntable 12 could also rotate about any axis, even one that is not central to the turntable 12. It will be understood that the cooking vessel 11 may take on a variety of configurations, and may be constructed from a variety of materials, most commonly ceramic, plastic, glass, or the like. The turntable 12 may rotate about wheels disposed radially from a central location of the turntable 12, or may rotate about a central pivot within the cooking device 31 that aligns with the central axis X of the turntable 12.

Figure 2:
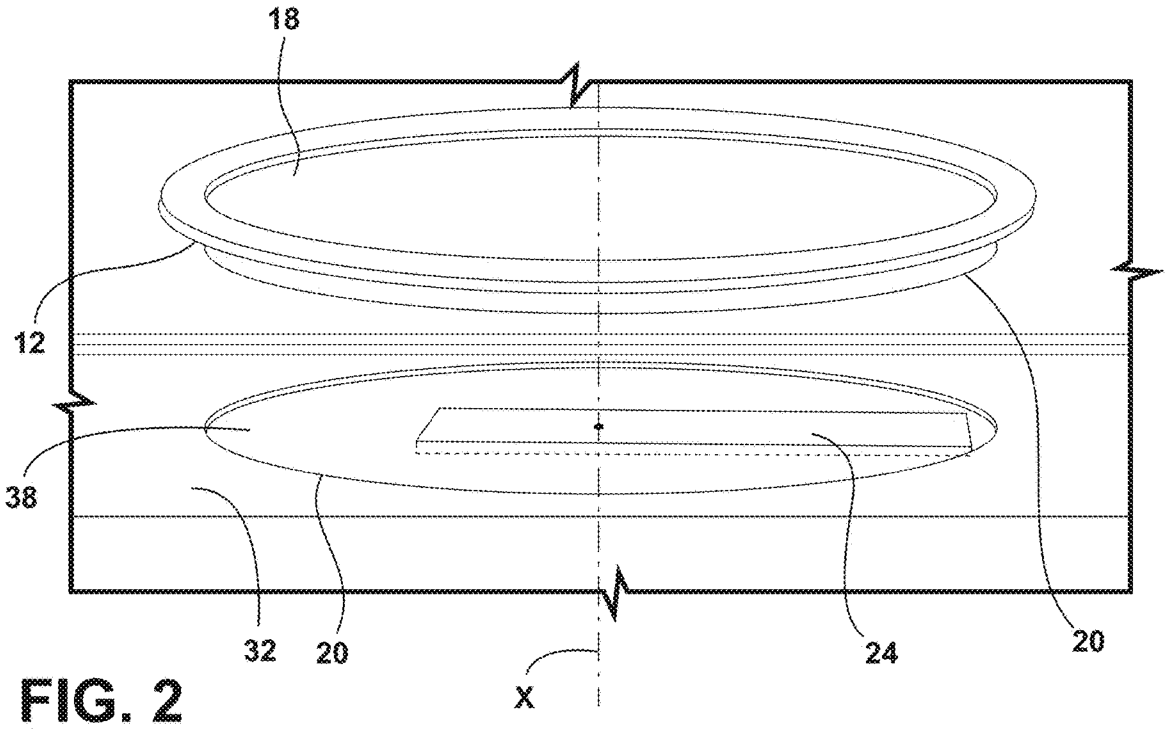
FIG. 2 is a front perspective view of a bar and turntable of a cooking device of the present disclosure.

As shown in FIG. 2, the turntable 12 is configured to rest above the bar 24. The bar 24 is generally constructed from a material that is magnetic or which is magnetizable, which may be in the form of a magnetic metal. Alternatively, the bar 24 may be constructed from another material, such as a polymer that includes magnetic features (for example, metal flakes or strips embedded within the polymer). The bar 24 maintains a static position within the cooking device 31, and more specifically, is secured to an inside support surface 32 of the cooking device 31. The bar 24 is proximate to or in abutting contact with the bottom surface 20 of the turntable 12. It is contemplated that the bar 24 may protrude from a planar extent of the inside support surface 32. Further, the bar 24 may be positioned within a recess 38 of the cooking device 31, which may also receive the bottom surface 20 of the turntable 12. Notably, the turntable 12 includes a thickness that is conducive to allow magnetic attraction to pass-through the turntable 12. In some configurations, the bar 24 may extend across approximately one-half a diameter of the turntable 12. However, it will be understood that the bar 24 may extend across any length of the turntable 12. In the illustrated configuration of FIG. 2, the bar 24 is shown in a fixed position. However, it will be understood that a different bar that is longer or shorter, or includes a thickness that is wider or thinner, may also be implemented by removing fasteners that secure the bar 24 to the bottom surface 20 and replacing the bar 24.

Figure 3A:
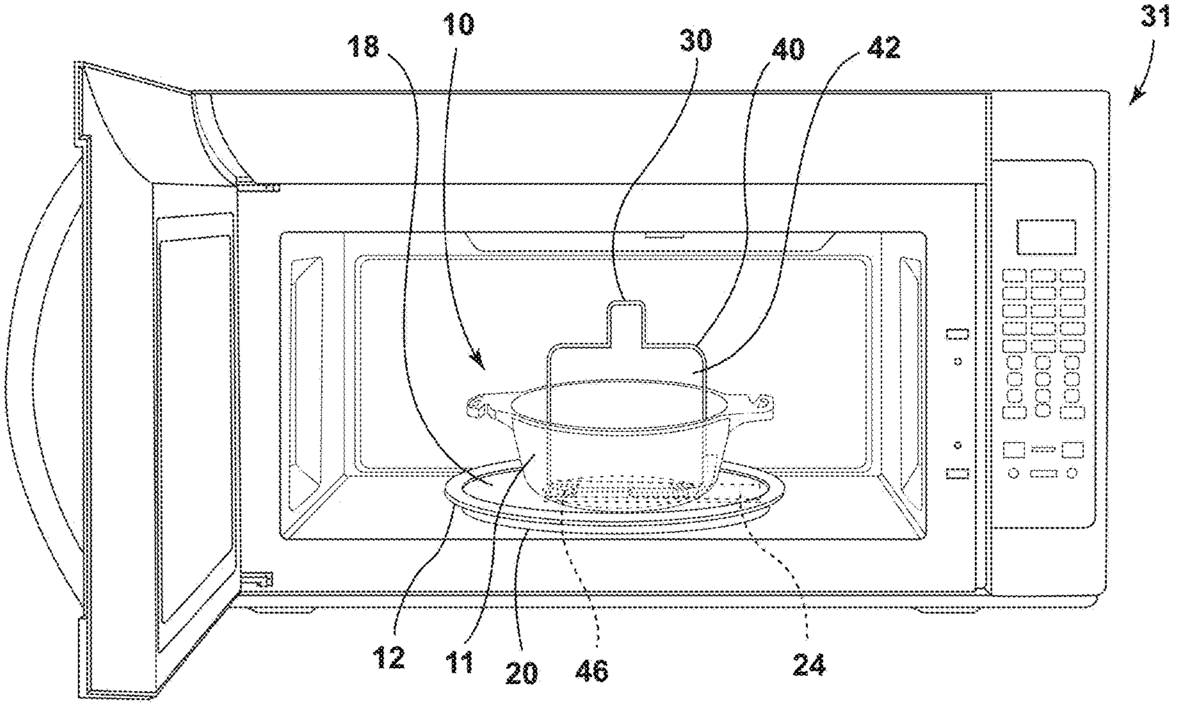
FIG. 3A is a front elevational view of a cooking device with a stirrer in position within a cooking vessel disposed inside the cooking device of the present disclosure.
Figure 3B:
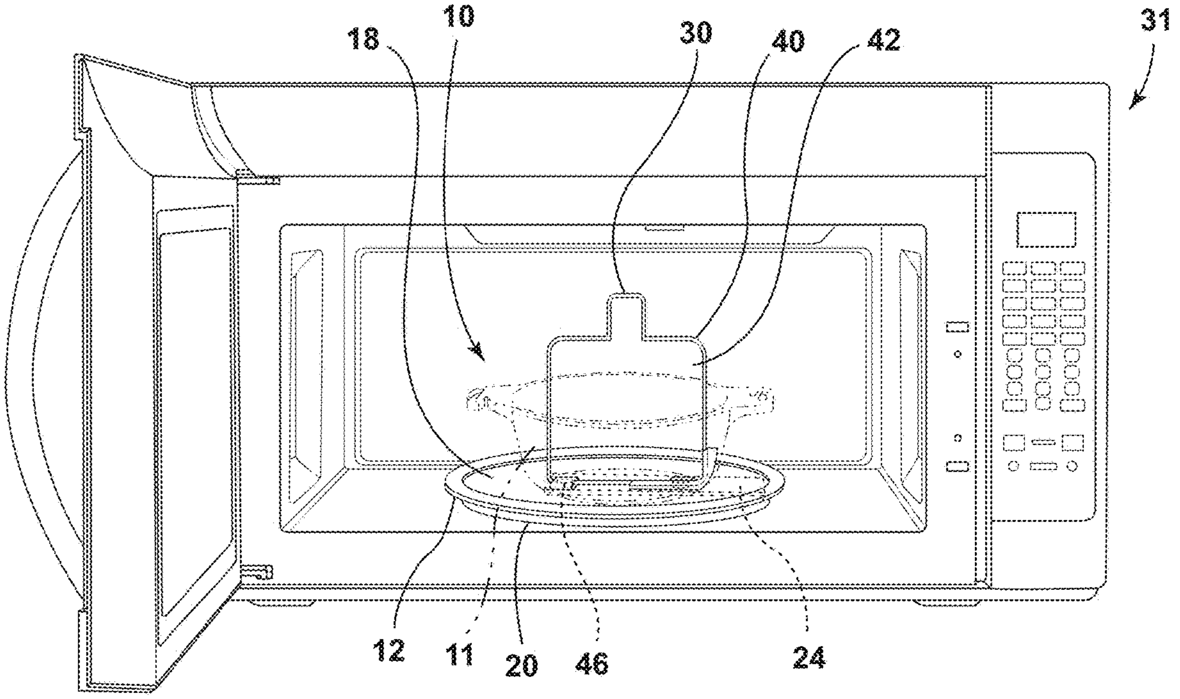
FIG. 3B is a front elevational view of the arrangement of FIG. 3A, with the cooking vessel shown in phantom.
Figure 3C:
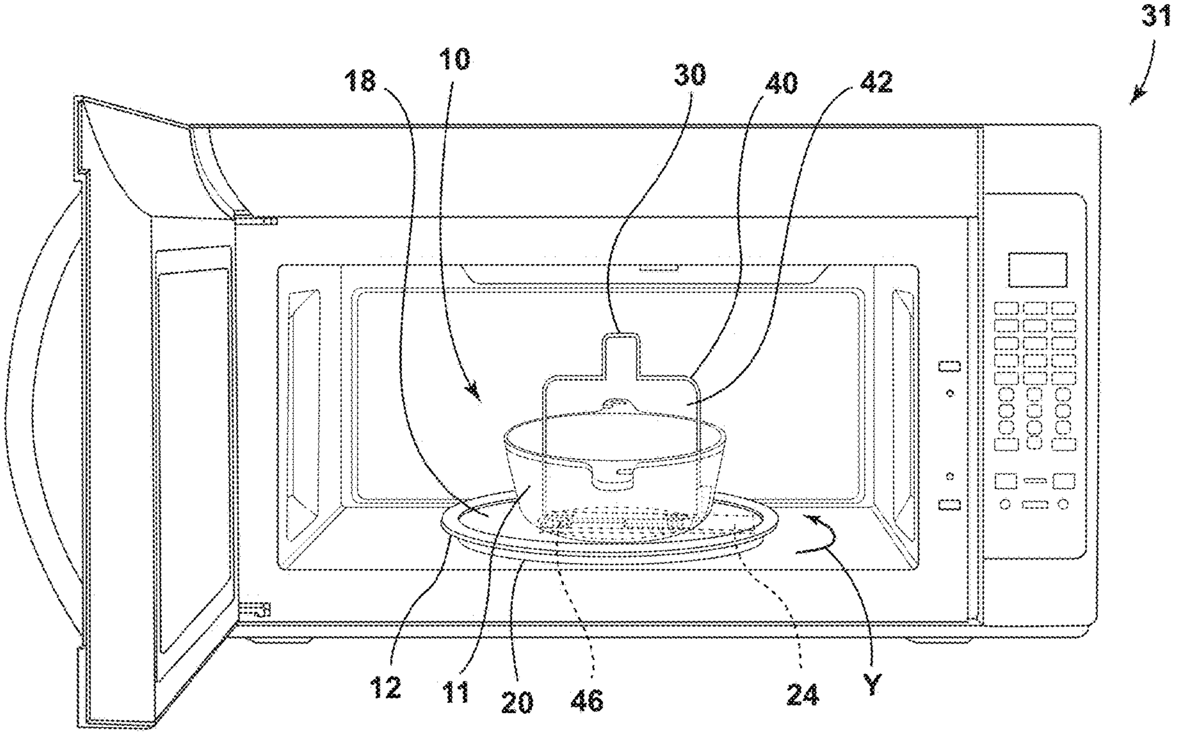
FIG. 3C is a front elevational view of the arrangement of FIG. 3A, while the cooking vessel is rotating on the turntable.
Figure 4:
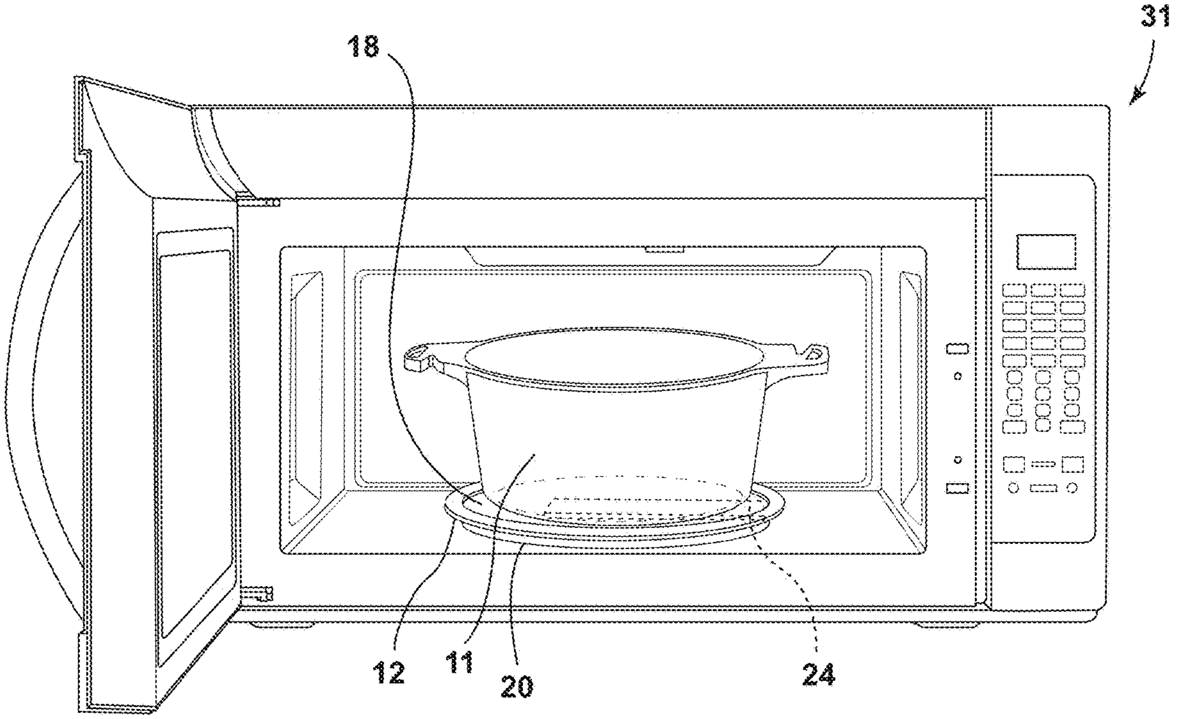
FIG. 4 is a front elevational view of a cooking appliance incorporating a stirring assembly with a large cooking vessel of the present disclosure.
Figure 5A:
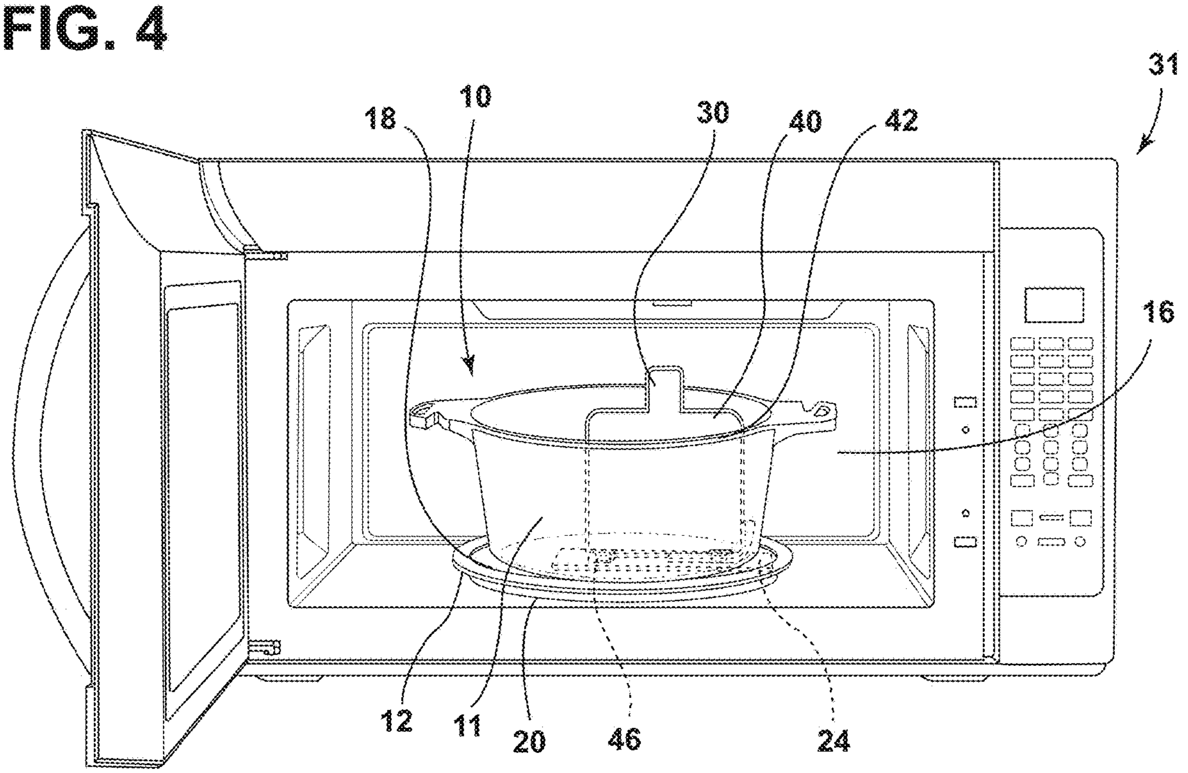
FIG. 5A is a front elevational view of a cooking device with a stirrer in position within a large cooking vessel disposed inside the cooking device of the present disclosure.
Figure 5B:
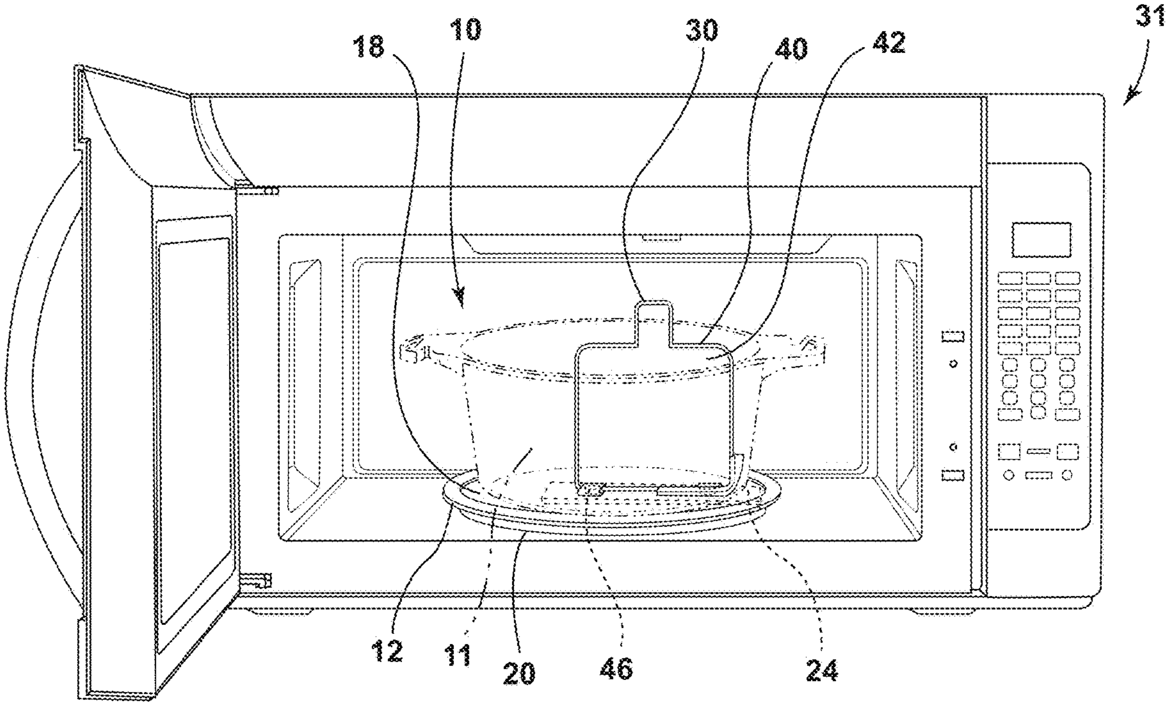
FIG. 5B is a front elevational view of the arrangement of FIG. 3A, with the large cooking vessel shown in phantom.
Figure 5C:
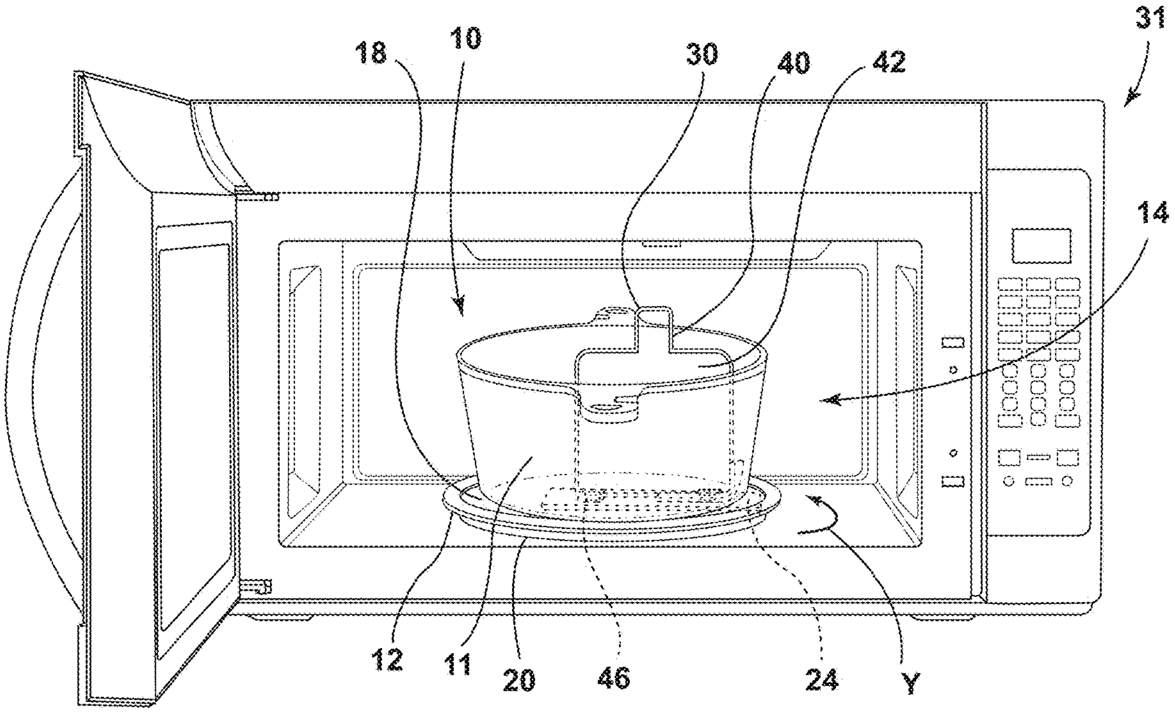
FIG. 5C is a front elevational view of the arrangement of FIG. 3A, while the large cooking vessel is rotating on the turntable.

With reference now to FIGS. 3A-3C, the stirrer 30 is configured for placement inside the cooking vessel 11. The stirrer 30 may extend across substantially all of a bottom surface of the cooking vessel 11 or a portion of the bottom surface of the cooking vessel 11. In addition, it is contemplated that the stirrer 30 may take on a variety of configurations and shapes and is not limited to the concise configuration shown in FIGS. 3A-3C or FIGS. 6 and 7. The stirrer 30 generally includes a frame 40 that includes a top segment 55, a bottom segment 56, and first and second side segments 59, 60. The frame 40 may enclose a generally planar body portion 42 of the stirrer 30, or may define an open interior space of the stirrer 30. The stirrer 30 also includes a first end that includes a first encapsulated magnet 46 that is surrounded by a first flexible polymeric material 48. The stirrer 30 also includes a second end that includes a second encapsulated magnet 50 that is encapsulated by a second flexible polymeric material 52. The second flexible polymeric material 52 may include a bottom portion 54 that follows the bottom segment 56 of the frame 40 and also a side portion 58 that follows the second side segment 60 of the frame 40. The bottom portion 54, or generally linear engagement surface, is configured to wipe or displace food goods from an inside bottom surface of the cooking vessel 11, while the side portion 58 is configured to wipe or displace food goods from a side wall of the cooking vessel 11. It is generally contemplated that either or both of the first and second flexible polymeric materials 48, 52 may include a material that is conducive for scraping or otherwise cleaning material from the inside bottom surface of the cooking vessel 11 during rotation of the cooking vessel 11 on the turntable 12. Alternatively, the first and second flexible polymeric materials 48, 52 may simply encapsulate the first and second magnets 46, 50 and have a thinner profile. Alternatively, the first and second flexible polymeric materials 48, 52 may include a predetermined height configured to stir a greater volume of food goods during rotation of the cooking vessel 11 on the turntable 12. It will also be understood that the stirrer 30 may include or be constructed of a hard plastic material, or that the stirrer 30 may be completely covered by one or more of an electric insulation material and a thermal insulation material.

During use, the first and second encapsulated magnets 46, 50 are attracted to the bar 24 disposed below the cooking vessel 11 and the turntable 12. As a result, during activation and rotation of the turntable 12, the first and second encapsulated magnets 46, 50 maintain position due to the attraction between the first and second encapsulated magnets 46, 50 and the bar 24 disposed below the turntable 12. As a result, the stirrer 30 maintains a generally aligned position and orientation over the bar 24, and as the cooking vessel 11 rotates on the turntable 12, the stirrer 30 has the effect of stirring the food goods within the cooking vessel 11.

With reference now to FIGS. 4 and 5A-5C, the stirrer 30 may also be used in conjunction with a larger cooking vessel 11. It will be understood that the effect of a larger cooking vessel 11 will simply result in less surface area on the bottom of the cooking vessel 11 being stirred during a rotation. However, a larger stirrer 30 or smaller stirrer 30 may be used in conjunction with any size cooking vessel 11. A protrusion, shown in the form of a handle 66, extends upward from the generally planar body portion 42, and is provided on the top segment 55 of the frame 40 to aid a user in inserting or removing the stirrer 30.

Figure 6:
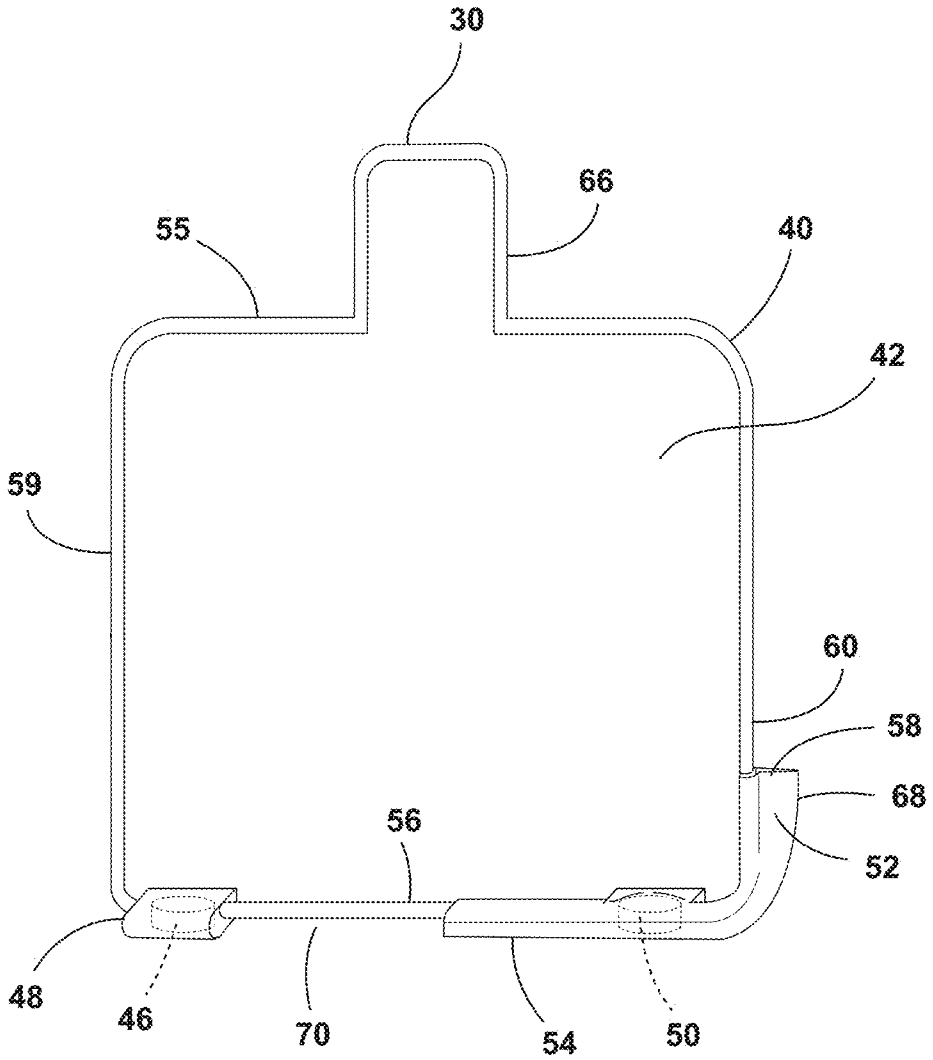
FIG. 6 is a front elevational view of a stirrer of the present disclosure.
Figure 7:
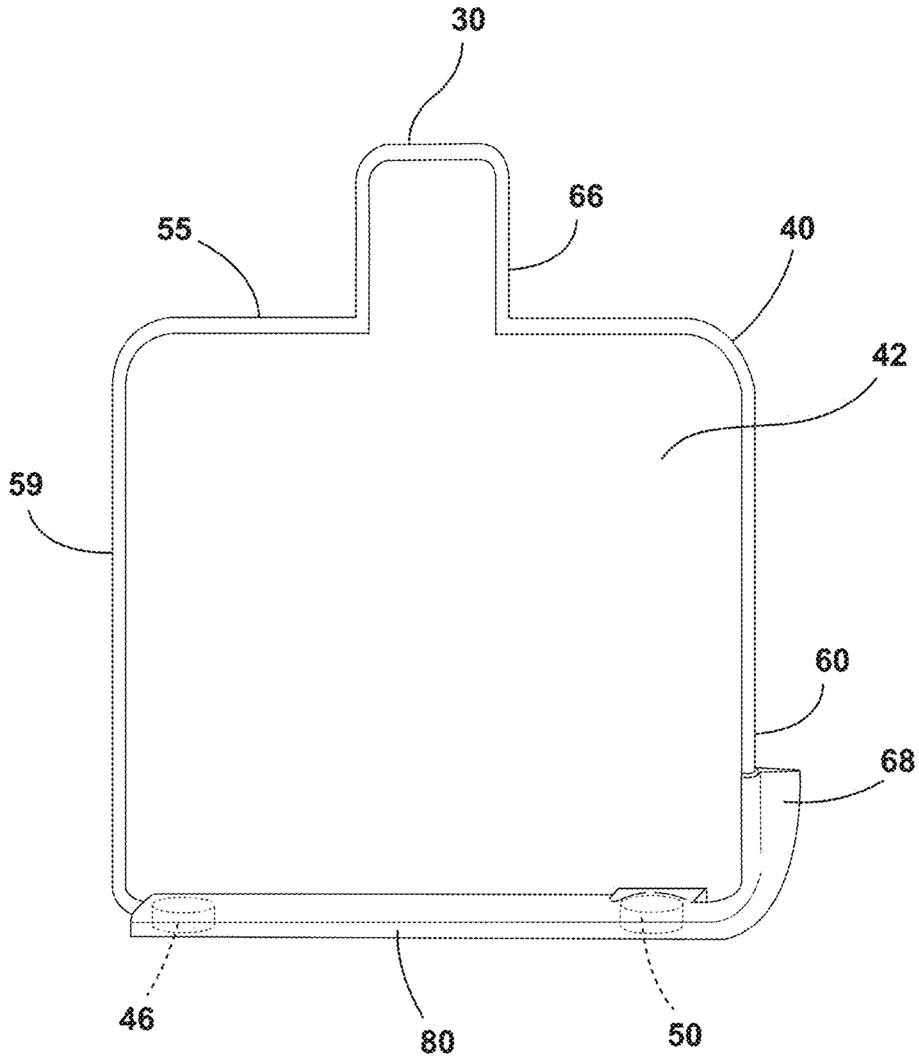
FIG. 7 is a front elevational view of a stirrer of the present disclosure.

In addition, with reference to FIGS. 6 and 7, the stirrer 30 may take on a variety of configurations. The stirrer 30 of both FIGS. 6 and 7 includes a flange 68 configured to wipe food goods from the inside bottom surface and the side walls of the cooking vessel 11 during rotation of the cooking vessel 11 on the turntable 12. As shown in FIG. 6, and as illustrated in FIGS. 3A-3C and 5A-5C, the stirrer 30 may include a gap 70 defined between the first flexible polymeric material 48 and the second flexible polymeric material 52. However, it is also contemplated that the gap 70 may be replaced with a single elongate polymeric connector 80 disposed between the first encapsulated magnet 46 and the second encapsulated magnet 50, resulting in entire area along the inside bottom surface of the cooking vessel 11 being stirred. It is also contemplated that a relative height of the first and second flexible polymeric materials 48, 52 may vary depending on a desired amount of volume of stirred materials that is preferred by the user. It will be understood that a smaller profile of the first and second flexible polymeric materials 48, 52 will result in minimal stirring or agitation proximate the inside bottom surface of the cooking vessel 11. The larger the height of the first and second flexible polymeric materials 48, 52, the more displacement of food goods during rotation of the cooking vessel 11.

According to one aspect of the present disclosure, a stirring assembly includes a turntable configured to rotate about a central axis. A cooking vessel is configured to engage a top surface of the turntable. A bar is disposed proximate a bottom surface of the turntable. The bar maintains a fixed position relative to the turntable. A stirrer is magnetically attracted to the bar. The stirrer is configured to generally maintain a fixed orientation within the cooking vessel as the cooking vessel rotates with the turntable.

According to another aspect of the present disclosure, a stirrer includes a hard plastic material.

According to still another aspect of the present disclosure, a stirrer is completely covered by an electric insulation material.

According to another aspect of the present disclosure, a stirrer is completely covered by a thermal insulation material.

According to yet another aspect of the present disclosure, a stirrer includes a first end having a first magnet and a second end having a second magnet.

According to another aspect of the present disclosure, a stirrer includes a generally planar body portion with a generally linear engagement surface and a protrusion extending upward from the generally planar body portion.

According to still yet another aspect of the present disclosure, a generally planar body portion defines a central opening configured to allow food to flow therethrough.

According to another aspect of the present disclosure, a bar extends across approximately one-half of a diameter of a turntable.

According to still another aspect of the present disclosure, a bar is uniformly attached to an inside support surface of a microwave oven.

According to yet another aspect of the present disclosure, a generally planar body portion includes first and second side segments. A flexible polymeric material is disposed on at least one of a generally linear engagement surface and the first and second side segments.

According to another aspect of the present disclosure, a stirring assembly for use with a cooking vessel includes a turntable that is operable between a rotating state and a non-rotating state. The turntable is configured for rotation about an axis and includes a top surface and a bottom surface. A bar is disposed proximate the bottom surface of the turntable. The bar maintains a fixed position while the turntable is in the rotating state. A stirrer is proximate the top surface of the turntable. The stirrer is magnetically attracted to and aligned with a longitudinal extent of the bar. The stirrer is configured to generally maintain a fixed orientation within the cooking vessel as the cooking vessel rotates with the turntable such that the stirrer does not rotate with the cooking vessel.

According to yet another aspect of the present disclosure, a microwave assembly includes a plurality of walls that define a cooking compartment and a turntable that is configured to rotate about a central axis. The turntable is also configured to support a cooking vessel. A bar is operably coupled with at least one of the plurality of walls that define the cooking compartment. The bar is disposed proximate a bottom surface of the turntable and maintains a fixed position relative to the turntable. A stirrer is attracted to the bar. The stirrer is configured to generally maintain a fixed orientation within the cooking vessel as the cooking vessel rotates with the turntable.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A stirring assembly comprising:

a turntable configured to rotate about a central axis;

a cooking vessel configured to engage a top surface of the turntable;

a bar disposed proximate a bottom surface of the turntable, wherein the bar maintains a fixed position relative to the turntable; and a stirrer including a vertically-extending frame that defines an open cavity and which is magnetically attracted to the bar, the stirrer including a first magnet encapsulated by a polymeric member at a first corner of the frame and spaced a predetermined distance from a second magnet encapsulated by a separate distinct polymeric member at a second corner of the frame, wherein the stirrer is configured to generally maintain a fixed orientation within the cooking vessel as the cooking vessel rotates with the turntable.

2. The stirring assembly of claim 1, wherein the stirrer includes a plastic material.

3. The stirring assembly of claim 1, wherein the stirrer is completely covered by an electric insulation material.

4. The stirring assembly of claim 1, wherein the stirrer is completely covered by a thermal insulation material.

5. The stirring assembly of claim 1, wherein the bar extends across approximately one-half of a diameter of the turntable.

6. The stirring assembly of claim 1, wherein the bar is uniformly attached to an inside support surface of a microwave oven.

7. The stirring assembly of claim 1, wherein the stirrer includes a generally planar body portion with a generally linear engagement surface and a protrusion extending upward from the generally planar body portion.

8. The stirring assembly of claim 7, wherein the generally planar body portion defines a central opening configured to allow food to flow therethrough.

9. The stirring assembly of claim 7, wherein the generally planar body portion includes first and second side segments, and wherein a flexible polymeric material is disposed on at least one of the generally linear engagement surface and the first and second side segments.

10. A stirring assembly for use with a cooking vessel comprising:

a turntable operable between a rotating state and a non-rotating state, the turntable configured for rotation about an axis, wherein the turntable includes a top surface and a bottom surface;

a bar disposed proximate the bottom surface of the turntable, wherein the bar maintains a fixed position while the turntable is in the rotating state; and a stirrer proximate the top surface of the turntable, wherein the stirrer includes a first magnet disposed proximate a first side segment and a second magnet disposed proximate a second side segment that includes a flexible wiping flange, and wherein the stirrer is configured to generally maintain a fixed orientation within said cooking vessel as said cooking vessel rotates with the turntable such that the stirrer does not rotate with said cooking vessel.

11. The stirring assembly of claim 10, wherein the stirrer includes a plastic material.

12. The stirring assembly of claim 10, wherein the stirrer is completely covered by an electric insulation material.

13. The stirring assembly of claim 10, wherein the bar extends across approximately one-half of a diameter of the turntable.

14. A microwave assembly comprising:

a plurality of walls defining a cooking compartment;

a turntable configured to rotate about a central axis, and further configured to support a cooking vessel;

a bar operably coupled with at least one of the plurality of walls defining the cooking compartment, wherein the bar is disposed proximate a bottom surface of the turntable, and wherein the bar maintains a fixed position relative to the turntable; and a stirrer attracted to the bar, wherein the stirrer is configured to generally maintain a fixed orientation within the cooking vessel as the cooking vessel rotates with the turntable, and wherein the stirrer includes a first magnet covered by a polymeric member at a first bottom corner of the stirrer, the first magnet being spaced from a second magnet that is covered by a polymeric member having a flexible wiping feature and disposed at a second bottom corner of the stirrer.

15. The microwave assembly of claim 14, wherein the bar is uniformly attached to an inside support surface of a microwave oven.

16. The microwave assembly of claim 14, wherein the stirrer is completely covered by a thermal insulation material.

17. The microwave assembly of claim 14, wherein the stirrer includes a generally planar body portion with a generally linear engagement surface and a protrusion extending upward from the generally planar body portion.

18. The microwave assembly of claim 17, wherein the generally planar body portion defines a central opening configured to allow food to flow therethrough.

* * * * *